US009419819B2

(12) United States Patent
Chen

(10) Patent No.: US 9,419,819 B2
(45) Date of Patent: Aug. 16, 2016

(54) METHODS AND COMPUTER PROGRAM PRODUCTS FOR CREATING PRESET INSTANT MESSAGE RESPONSES FOR INSTANT MESSAGES RECEIVED AT AN IPTV

(75) Inventor: Jing Chen, Alpharetta, GA (US)

(73) Assignee: AT&T INTELLECTUAL PROPERTY I, L.P., via transfer from AT&T DELAWARE INTELLECTUAL PROPERTY, INC., Atlanta, GA (US)

(*) Notice: Subject to any disclaimer, the term of this patent is extended or adjusted under 35 U.S.C. 154(b) by 1727 days.

(21) Appl. No.: 11/960,996

(22) Filed: Dec. 20, 2007

(65) Prior Publication Data
US 2009/0164914 A1    Jun. 25, 2009

(51) Int. Cl.
H04L 12/58 (2006.01)
G06Q 10/10 (2012.01)
H04N 7/173 (2011.01)
H04N 21/4786 (2011.01)
H04N 21/4788 (2011.01)
H04N 21/61 (2011.01)

(52) U.S. Cl.
CPC ............ H04L 12/581 (2013.01); G06Q 10/107 (2013.01); H04L 51/04 (2013.01); H04N 7/173 (2013.01); H04N 21/4786 (2013.01); H04N 21/4788 (2013.01); H04N 21/6125 (2013.01)

(58) Field of Classification Search
CPC ....... H04L 51/02; H04L 51/04; H04L 12/581; G06Q 10/10; H04N 21/4786; H04N 21/4788
USPC ............................ 715/758; 707/999; 725/109
See application file for complete search history.

(56) References Cited

U.S. PATENT DOCUMENTS

| 6,026,410 | A | * | 2/2000 | Allen | G06Q 10/10 |
| 6,029,171 | A | * | 2/2000 | Smiga | G06Q 10/10 |
| 6,553,347 | B1 | * | 4/2003 | Tavor | G06Q 10/083 705/1.1 |
| 7,593,945 | B2 | * | 9/2009 | DaCosta | |
| 2002/0120581 | A1 | * | 8/2002 | Schiavone | G06Q 10/107 705/64 |
| 2003/0200195 | A1 | * | 10/2003 | Muhlenhaupt | H04M 3/493 |
| 2004/0243918 | A1 | * | 12/2004 | Jones et al. | 714/807 |
| 2005/0080864 | A1 | * | 4/2005 | Daniell | H04L 12/581 709/206 |
| 2007/0027918 | A1 | * | 2/2007 | Kawakami | G06Q 10/107 |
| 2008/0036586 | A1 | * | 2/2008 | Ohki | G01C 21/362 340/539.13 |
| 2008/0172706 | A1 | * | 7/2008 | Robinson et al. | 725/109 |
| 2009/0150500 | A1 | * | 6/2009 | Kumar | H04L 12/58 709/206 |
| 2010/0241713 | A1 | * | 9/2010 | Shimizu | G06Q 50/00 709/206 |

* cited by examiner

Primary Examiner — Jeffrey A Gaffin
Assistant Examiner — Mandrita Brahmachari
(74) Attorney, Agent, or Firm — Cantor Colburn LLP

(57) ABSTRACT

Exemplary embodiments relate to methods and computer program products for the presentation and selection of preset instant messaging responses in an IPTV environment. The method comprises respectively associating each of a plurality of predetermined keywords with at least one content-specific reply message, respectively associating each of the plurality of keywords with at least one content-specific graphic icon, and respectively associating each of a plurality of graphic icons with at least one content-specific reply message. The method also comprises receiving an instant message, determining if a predetermined keyword is comprised within the received instant message, and displaying the received instant message. Yet further, the method comprises creating an instant message reply to the received instant message, and transmitting the instant message reply to the remote communication device.

12 Claims, 6 Drawing Sheets

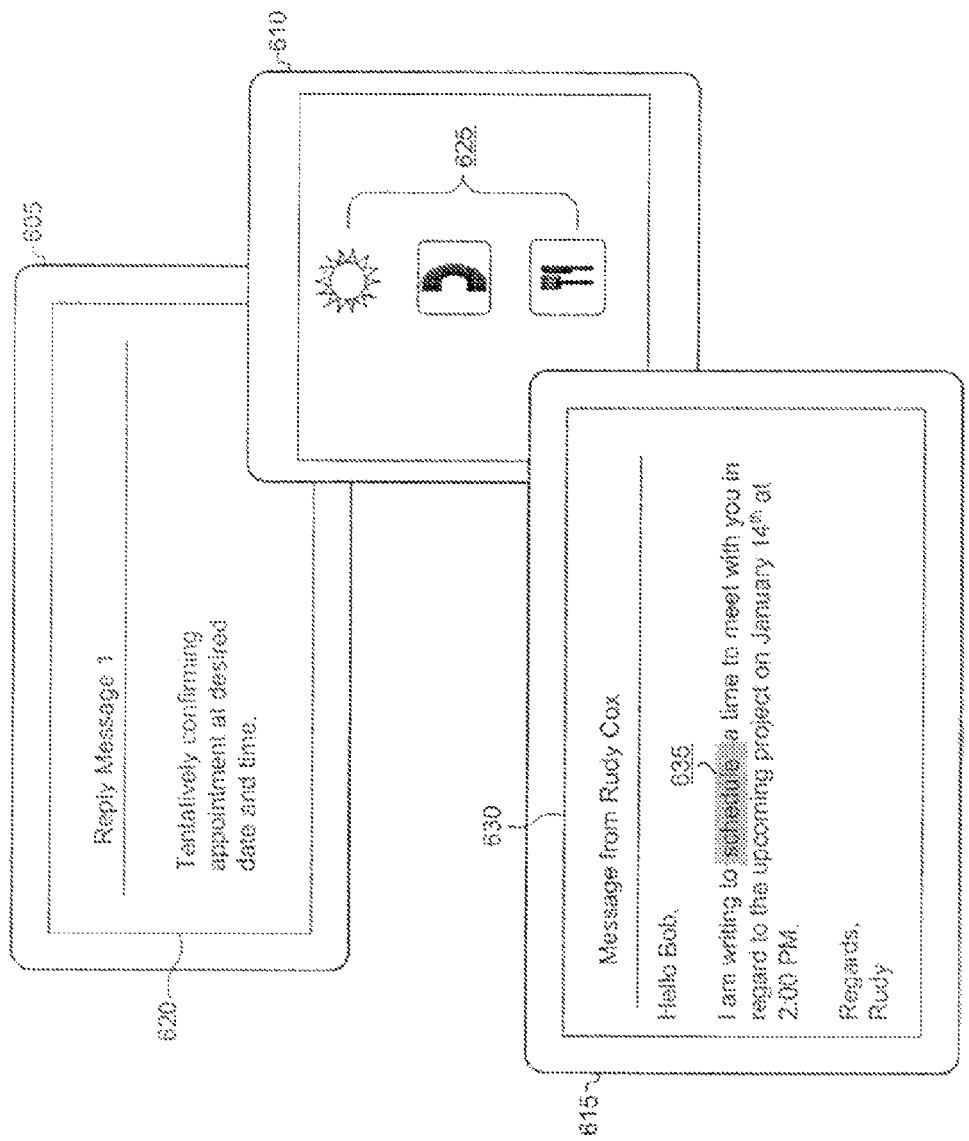

METHODS AND COMPUTER PROGRAM PRODUCTS FOR CREATING PRESET INSTANT MESSAGE RESPONSES FOR INSTANT MESSAGES RECEIVED AT AN IPTV

BACKGROUND

1. Field of Invention

The present invention relates generally to the implementation of interactive communication services within an IPTV environment, and more particularly, to the creation and delivery of responses to instant messages within an IPTV environment.

2. Description of Background

Internet Protocol Television (IPTV) is a digital television delivery system wherein television content is delivered using Internet protocols via a networked configuration. As such, IPTV content can be delivered in live television multicasting formats in addition to stored video formats. Due to its networked implemented configuration, IPTV provides viewers with the capability to engage in truly interactive viewing experiences. These interactive aspects include the capability to access interactive content programming guides or picture-in-picture content viewing functionalities. The networked configured aspects of an IPTV system can also provide a viewer with the capability to have access to email messaging systems via a web browser.

Currently, instant messaging (IM) systems have become a popular alternative to conventional email messaging systems. IM systems are computing systems wherein two or more computing system users exchange text messages in real-time via. IM system users can transmit an instant message to an individual as long as the individual is on-line. To be effective, IM messaging systems require that all parties to an IM encounter be on-line or have activated communication devices operating at the same time. Within a communication encounter IM messages are exchanged via an instant messaging window that is displayed at the system that each IM user enters their messages. As such, the users can view each other's transmitted messages as they are entered into the system, thus forming a visual textual conversation.

BRIEF SUMMARY

Exemplary embodiments include a method for the presentation and selection of preset instant messaging responses in an IPTV environment. The method comprises respectively associating each of a plurality of predetermined keywords with at least one content-specific reply message, respectively associating each of the plurality of keywords with at least one content-specific graphic icon, and respectively associating each of a plurality of graphic icons with at least one content-specific reply message. The method also comprises receiving an instant message, determining if a predetermined keyword is comprised within the received instant message, and displaying the received instant message. Yet further, the method comprises creating an instant message reply to the received instant message, and transmitting the instant message reply to the remote communication device.

Additional exemplary embodiments include a computer program product. The computer program product includes a computer readable medium useable by a processor, the medium having stored thereon a sequence of instructions that, when executed by one or more processors, causes the one or more processors to create a response to an instant message from a presentation of a selection of preset instant messaging responses in an IPTV environment by respectively associating each of a plurality of predetermined keywords with at least one content-specific reply message. Each of the plurality of keywords is respectively associated with at least one content-specific graphic icon, each of a plurality of graphic icons respectively associated with at least one content-specific reply message. Further, the computer program product receives an instant message, determines if a predetermined keyword is comprised within the received instant message, and displays a text of the received instant message. Yet further, an instant message reply is created in response to the received instant message, and the instant message reply is transmitted.

Other systems, methods, and/or computer program products according to embodiments will be or become apparent to one with skill in the all upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGS.

The detailed description explains the exemplary embodiments, together with advantages and features, by way of example with reference to the drawings.

DETAILED DESCRIPTION OF EXEMPLARY EMBODIMENTS

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Figure 1:
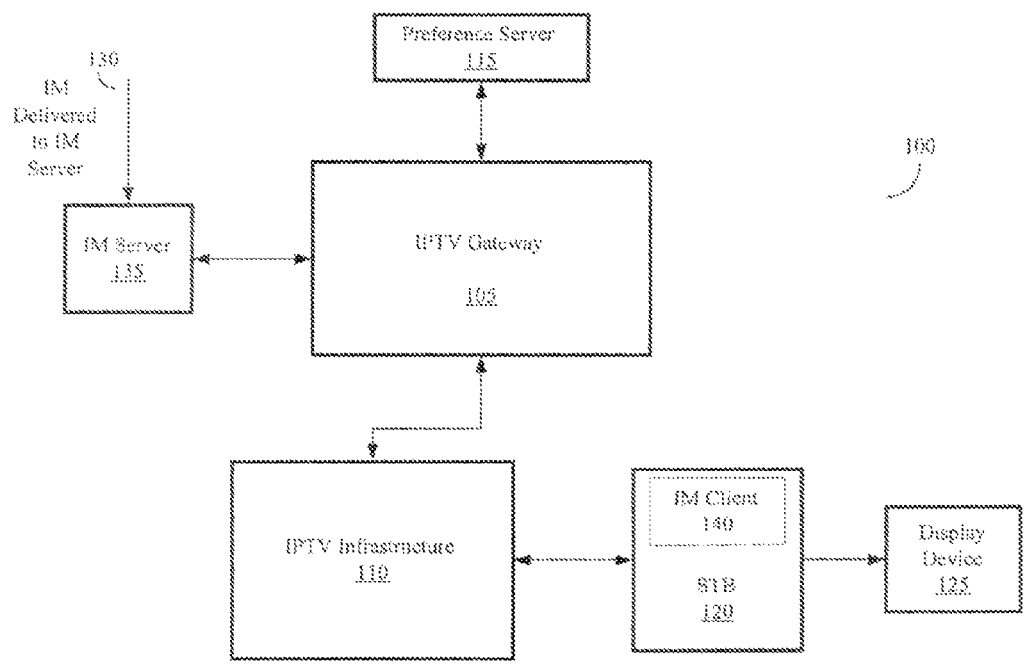
FIG. 1 is a diagram illustrating an exemplary IPTV system environment that can be implemented in accordance with exemplary embodiments.

Exemplary embodiments of the present invention comprise methodologies and computer program products for responding to an IM that is received at a user/customer's display device within an IPTV environment. An exemplary IPTV system 100 is shown in FIG. 1. IMs 130 received from remote computing systems or remote communication devices (e.g., a cell phone, networked PDA or portable computer, etc.) are delivered to an IM server 135 wherein thereafter the IMs are delivered to an IPTV gateway 105. According to exemplary embodiments, the IPTV gateway 105 is responsible for the management, provisioning, storage, and delivery of IPTV content within the IPTV environment 100. Additionally an IPTV processing infrastructure 110 may be responsible for maintaining IPTV system user accounts and information in regard to set top boxes 120 (STBs) that are associated with IPTV user accounts. Using conventional means, an IPTV user can configure any STB 120 that is associated with their IPTV user account to display IMs at a display device 125 that is in communication with their account sanctioned STB 120.

According to exemplary embodiments, the IPTV gateway 105 interfaces with a preferences server 115, wherein the preference server 115 is responsible for handling the interactive and viewing preferences for the IPTV system 100 as dictated by the desires of all IPTV subscriber. Further, the IPTV gateway 105 is responsible for retrieving an IPTV subscribers preferences for each IPTV STB 120 that is associated with the IPTV subscriber's user account from the preferences server 115. Additionally, for each STB 120 comprising an IM client application 140 that is configured to receive and transmit IM information, the IPTV gateway 105 may interact with the IPTV infrastructure 110 to accomplish the actual transmittal or reception of an IM to the transmitting or receiving STB 120.

Within exemplary embodiments of the present invention IMs are delivered to a specific IPTV user account that is maintained at the IPTV infrastructure 110. Within further exemplary embodiments, IMs can be transmitted to a specific respective STB 120 of a user in the event that a user has more than one STB 120 that is associated with their user account. IMs that have been transmitted to a user may be displayed to the user via the display device 125 that is in communication with the respective STBs 120 that may be associated with a user's account. As such, the interactive IMs are displayed to a user via a pop-up GUI window that overlays any image that is currently displayed on the display device 125, according to exemplary embodiments.

Within yet further exemplary embodiments of the present invention responses to received IMs are preset and saved within the IPTV system 100 at a user's account or within the STB(s) 120 that are associated with a user's account. An IPTV user can edit preset IM response messages by accessing the preset messages that are saved and associated with a user's account within the IPTV processing infrastructure 110. The preset IM responses can be edited by accessing and editing the response messages associated with an IPTV account via a computing system, or by accessing and editing the response messages by way of a GUI displayed at the display device 125 via a remote control device that is associated with the respective STB 120 that is associated with the display device 125. Within the exemplary embodiments, the remote control device can comprise a set of physical input entry buttons—or hotkeys—wherein each button/hotkey is associated with at least one content-specific reply message, wherein upon the activation of a hotkey, the hotkey is further configured to select a content-specific reply message for transmittal. A user selecting a preset response message can create an IM response within embodiments of the present invention; thereinafter the preset message is delivered as an IM response to the received IM.

Figure 2:
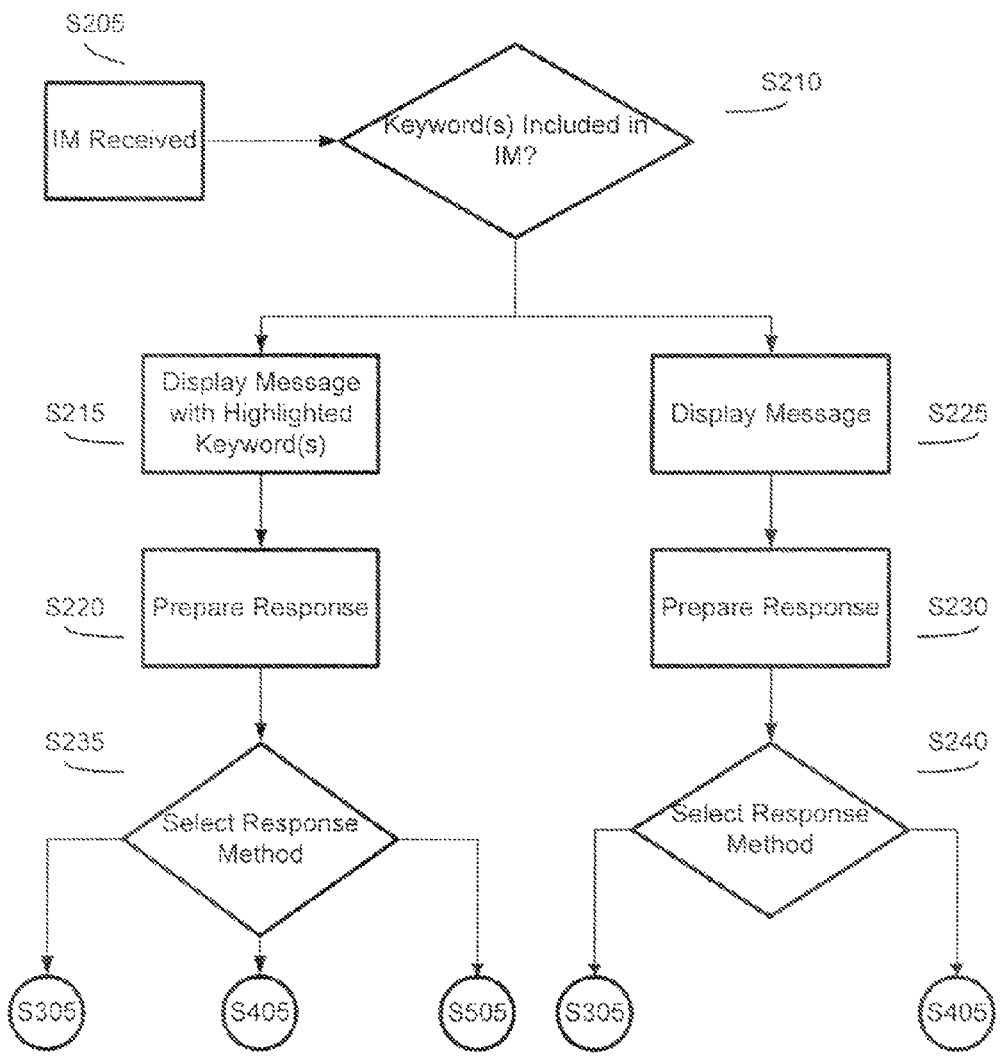
FIG. 2 is a flow diagram illustrating aspects of a method for responding to an IM message that is received within an IPTV environment in accordance with exemplary embodiments.

FIG. 2 shows a flow diagram illustrating aspects of a method for responding to an IM message that is received within an IPTV environment. At step 205, an IM is received at the IPTV processing infrastructure 110. The IM message can be further processed at a dedicated IM processing application, such as the IM client application 140, that resides either at the IPTV processing infrastructure 110 or a STB, such as the STB 120, that is associated with the IPTV account of the IM receiving party. At step 210, the IM is analyzed by the dedicated IM processing application 140 in order to determine if the IM contains any predetermined keywords. Within aspects of the present invention, predetermined words—keywords—can be associated with a single preset IM textual response message or a plurality of IM textual response messages. When discovered within an IM, a keyword can be highlighted within a display of the IM (e.g., by underling the keyword, changing the color of the displayed keyword, etc.).

At step 215, the IM message is displayed within an IM GUI window at a display device, such as the display device 125 that is in communication with the STB 120, wherein the keywords of the IM are emphasized or highlighted within the display. In the event that an IM does not contain any predetermined keywords, then at step 225, the text of the IM is displayed with no further visual detail. At steps 220 and 230, responses are prepared to the received IM message. At step 235, a determination is made as to how the response to the received IM will be created. In this instance, the user is presented with the option of creating a IM response by selecting from a displayed GUI window a graphical icon that is associated with a preset text message(s) (step 305), selecting a preset text message (step 405), or selecting a keyword that that has been associated with a predetermined text message(s) (step 505). Similarly, at step 240, a determination is made as to how a response to the received IM will be created. In this event, a user is presented with the option of selecting from a displayed GUI window a graphical icon that is associated with a preset text message(s) (step 305), or selecting a preset text message (step 405).

Figure 3:
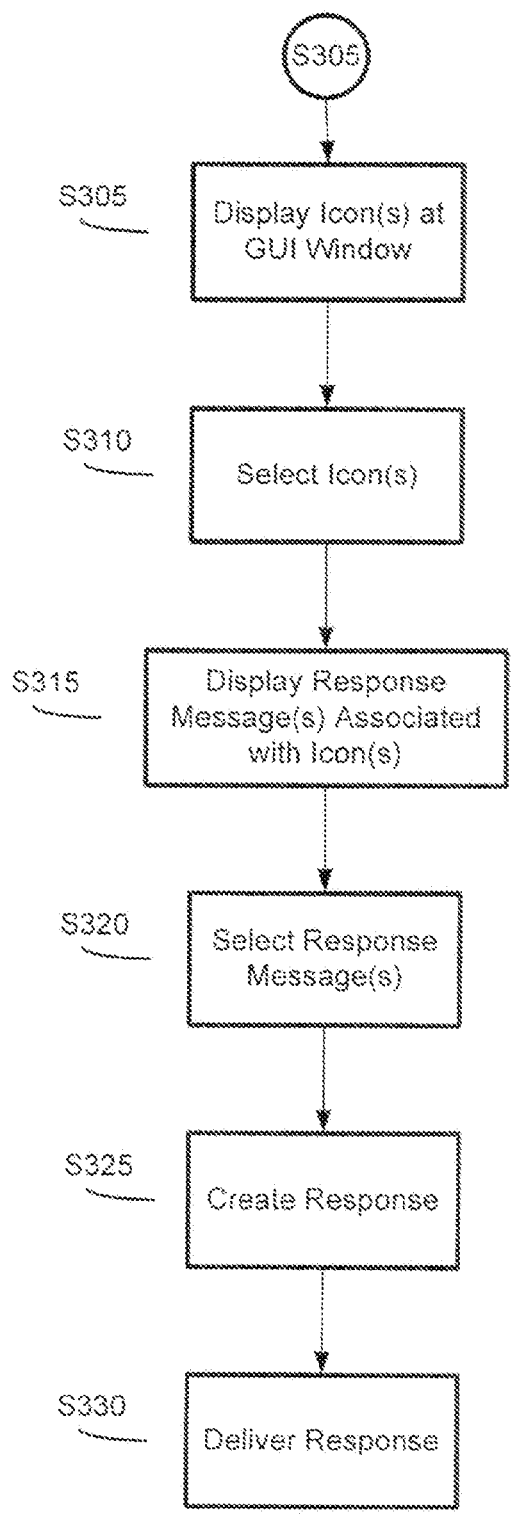
FIG. 3 is a flow diagram illustrating aspects of a method for responding to an IM message that is received within an IPTV environment by the selection of a display icon in accordance with exemplary embodiments.

FIG. 3 shows a flow diagram detailing the aspects of using a displayed graphical icon to create an IM response. At step 305, a GUI window dedicated to displaying graphical icons that are associated with preset IM response messages is displayed to a user. The GUI window can be opened in response to an input that is received directly from the STB 120 or a remote control device that is in communication with the STB. At 310 a user selects an icon that is appropriate for responding to a received IM. For example, an IM is received requesting a meeting at a specific time. In this instance, a graphical icon of a clock can be associated with a predetermined message that features a time-specific acknowledgement response; wherein the reply message can specify that the receiver accepts the specified time appointment.

At step 315, the preset response text message or messages that have been associated with the graphical icon are displayed to the user. At step 320, the user selects the response message by entering a command at the STB 120 or a remote control device that is in communication with the STB, wherein upon selection, the text of the response message is displayed in the IM GUI window—thereafter being delivered to the sender of the original IM (steps 325 and 330) upon the user's execution of a message transmittal command operation.

Figure 4:
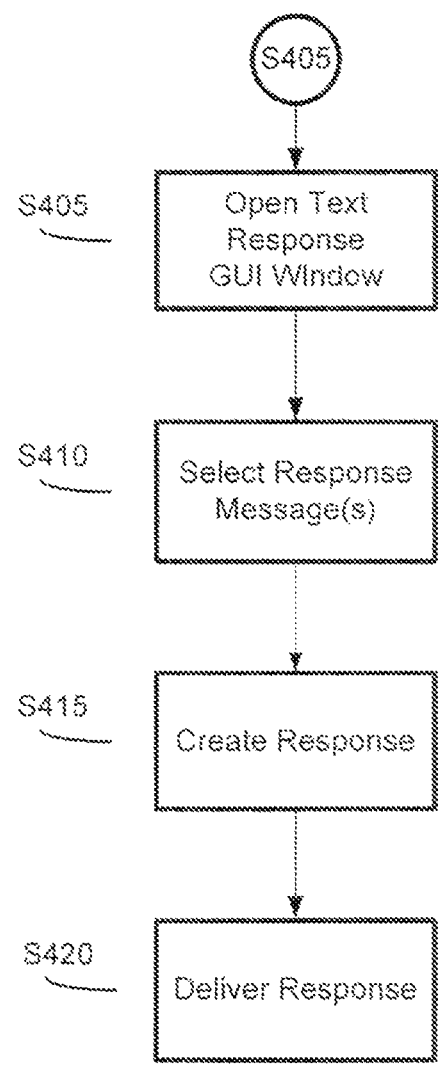
FIG. 4 is a flow diagram illustrating aspects of a method for responding to an IM message that is received within an IPTV environment by the selection of a pre-formatted text response in accordance with exemplary embodiments.

FIG. 4 shows a flow diagram illustrating aspects of a method for responding to an IM message that has been received within an IPTV environment by the selection of a pre-formatted text response. At step 405, a GUI window dedicated to displaying a listing of textual IM responses is displayed to a user. The textual response GUI window can be opened in response to an input that is received directly from the STB 120 or a remote control device that is in communication with the STB. At step 410, the user selects an appropriate IM response message from the displayed listing of IM response messages. Thereafter, the selected IM response is displayed within the IM GUI window delivered to the original IM sender and (steps 415 and 420).

Figure 5:
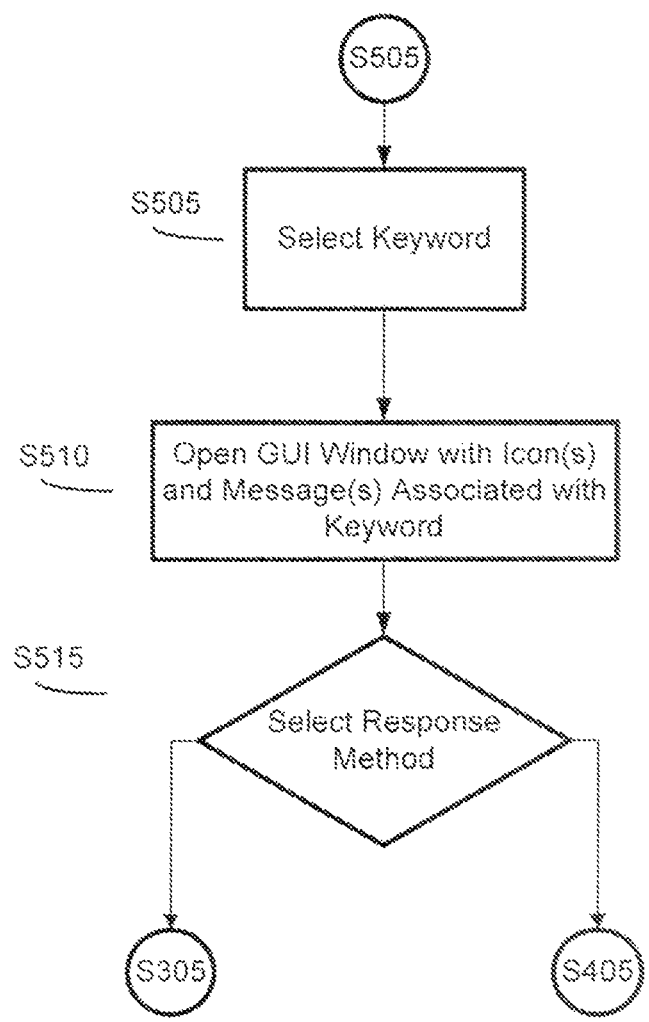
FIG. 5 is a flow diagram illustrating aspects of a method for responding to an IM message that is received within an IPTV environment by the selection of a highlighted keyword in accordance with exemplary embodiments.

FIG. 5 is a flow diagram illustrating aspects of a method for responding to an IM message that is received within an IPTV environment by the selection of a highlighted keyword that is displayed within an IM at an IM GUI window. At step 505, a user selects a predetermined keyword (or keywords) that is highlighted within the displayed IM. The keyword can be selected by entering a command at the STB 120 or a remote control device that is in communication with the STB. Upon a selection of a keyword, a GUI window is opened wherein graphical icons that are associated with the keyword and a list of preset messages that are associated with the keyword are displayed (step 510). At step 515, a determination is made as to the procedure that will be utilized to create a response to the received IM. In the instance that a user selects a graphical icon to create an IM response (step 305) then the response steps as detailed within the flow diagram of FIG. 3 are followed. In the instance that a user selects a preset text message from a displayed listing of messages (step 405) to create all IM response, then the response steps as detailed within the flow diagram of FIG. 4 are followed.

As shown in FIG. 6, within the exemplary embodiments of the present invention as described above, IM responses can be created by selecting a preset textual response message 620 from a GUI window 605, selecting a graphical icon 625 that is associated with a preset message or messages from a GUI window 610, or selecting a keyword 635—that is associated with a preset message or messages (620)—that is highlighted within a received IM 630 displayed within a GUI 615.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments.

The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for the presentation and selection of preset instant messaging responses in an Internet Protocol television environment, the method comprising:

associating a keyword with a content-specific reply message;

receiving an instant message from a sender communication device to a receiver from an instant message server, the instant message being transmitted to a specific individual Internet Protocol television user account associated with a specific respective set top box;

routing the instant message to the set top box associated with the Internet Protocol television account associated with the receiver;

receiving the instant message at an Internet Protocol television client;

in response to determining that the instant message comprises the keyword displaying the instant message on a display device in communication with the Internet Protocol television client, and highlighting the keyword in the instant message;

upon selection of the keyword in the instant message, creating an instant message reply to the instant message from the content-specific reply message that is associated with the keyword, the creating in response to the selection of the keyword in the instant message; and transmitting the instant message reply to the sender communication device;

wherein the content-specific reply message is automatically displayed in a graphical user interface window of the display device when a cursor is placed over the keyword in the instant message;

wherein the content-specific reply message selected from the graphical user interface window is used to create the instant message reply;

wherein a hotkey of a set of hotkeys comprised within a remote control device is associated with the content-specific reply message, wherein upon activation of the hotkey, the method includes selecting the content-specific reply message for transmittal;

wherein the remote control device is configured to launch a search/navigation window via the Internet Protocol television client, wherein the search/navigation window comprises the content-specific reply message.

2. The method of claim 1, further comprising storing the content-specific reply message locally at an Internet Protocol television set top box, the Internet Protocol television set top box in communication with the Internet Protocol television client and the display device.

3. The method of claim 1, wherein the instant message is transmitted directly to an Internet Protocol television set top box that is in communication with the Internet Protocol television client.

4. The method of claim 1, wherein the keyword is automatically highlighted within the instant message.

5. The method of claim 1, further comprising associating a graphic icon with the keyword and displaying the graphic icon within the instant message.

6. The method of claim 5, further comprising displaying the content-specific reply message associated with the graphic icon upon selection of the graphic icon within a graphical user interface window of the display device.

7. The method of claim 6, wherein the content-specific reply message selected from the graphical user interface window is used to create the instant message reply to the instant message.

8. A computer program product that includes a non-transitory computer readable medium useable by a processor, the medium having stored thereon a sequence of instructions that, when executed by the processor, causes the processor to create a response to an instant message from a presentation of a selection of preset instant messaging responses in an Internet Protocol television environment by:

associating a keyword with a content-specific reply message;

receiving an instant message from a sender communication device to a receiver from an instant message server, the instant message being transmitted to a specific individual Internet Protocol television user account associated with a specific respective set top box;

routing the instant message to a set top box associated with the Internet Protocol television account associated with the receiver;

receiving the instant message at an Internet Protocol television client;

in response to determining that the instant message comprises the keyword:

displaying the instant message on a display device in communication with the Internet Protocol television client, and highlighting the keyword in the instant message;

upon selection of the keyword in the instant message, creating an instant message reply to the instant message from the content-specific reply message that is associated with the keyword, the creating in response to the selection of the keyword in the instant message; and transmitting the instant message reply to the sender communication device;

wherein the content-specific reply message is automatically displayed in a graphical user interface window of the display device when a cursor is placed over the keyword in the instant message;

wherein the content-specific reply message selected from the graphical user interface window is used to create the instant message reply;

wherein a hotkey of a set of hotkeys comprised within a remote control device is associated with the content-specific reply message, wherein upon activation of the hotkey, the method includes selecting the content-specific reply message for transmittal;

wherein the remote control device is configured to launch a search/navigation window via the Internet Protocol television client, wherein the search/navigation window comprises the content-specific reply message.

9. The computer program product of claim 8, wherein the keyword is automatically highlighted within the instant message.

10. The computer program product of claim 8, further comprising instructions for associating a graphic icon with the keyword and displaying the graphic icon within the instant message.

11. The computer program product of claim 10, further comprising instructions for displaying the content-specific reply message associated with the graphic icon upon selection of the graphic icon within a graphical user interface window of the display device.

12. The computer program product of claim 11, wherein the content-specific reply message selected from the graphical user interface window is used to create the reply to the instant message.

* * * * *